T. N. THOMSON.
INCUBATOR.
APPLICATION FILED APR. 30, 1910.

1,039,844.

Patented Oct. 1, 1912.

WITNESSES:
René Bruine
William F. Martine

INVENTOR:
Thomas N. Thomson,
By Attorneys,
Arthur C. Fraser & Usina

UNITED STATES PATENT OFFICE.

THOMAS N. THOMSON, OF SCRANTON, PENNSYLVANIA, ASSIGNOR TO INTERNATIONAL POULTRY SALES COMPANY, OF BROWN MILLS, NEW JERSEY, A CORPORATION OF NEW JERSEY.

INCUBATOR.

1,039,844.      Specification of Letters Patent.      Patented Oct. 1, 1912.

Application filed April 30, 1910. Serial No. 558,641.

*To all whom it may concern:*

Be it known that I, THOMAS N. THOMSON, a citizen of the United States, residing in Scranton, Lackawanna county, Pennsylvania, have invented certain new and useful Improvements in Incubators, of which the following is a specification.

For successful incubation it is essential to maintain a very close and accurate regulation of temperature and a very nearly constant humidity. The temperature should be maintained very close to 103° F. and the humidity between sixty and sixty-five per cent.

The object of the present invention is to provide for the proper humidifying of the air in the incubator so as to maintain it automatically at the proper humidity.

The heater used is of the air-heating type, the air being heated by flowing around a flue or chamber through which the products of combustion from the lamp or other heating device circulate. The temperature within the incubator is regulated by short circuiting the heated gases from the lamp so that they escape directly into the atmosphere and cease to heat the intervening wall, to thereby diminish the heat imparted to the circulating air, instead of allowing this heated air to escape.

For maintaining constant humidification this invention provides for passing warm or heated air at a sufficiently lower temperature than that required in the incubator into contact with water or moisture in such manner that it becomes saturated therewith, and then passing this air so saturated through the heater to raise its temperature sufficiently to maintain the temperature in the incubating chamber at the required degree (approximately 103° F.), whereby its humidity is reduced from saturation to the required percentage of humidity. To attain this required percentage the temperature of the air at the time it is brought into contact with moisture is so controlled as to enable it to take up the required quantity of moisture to bring the humidity in the air when finally heated to the precise percentage desired.

The accompanying drawings show an incubator embodying the preferred form of this invention, but omitting the usual egg trays and details which form no novel part of the present invention.

Figure 1:
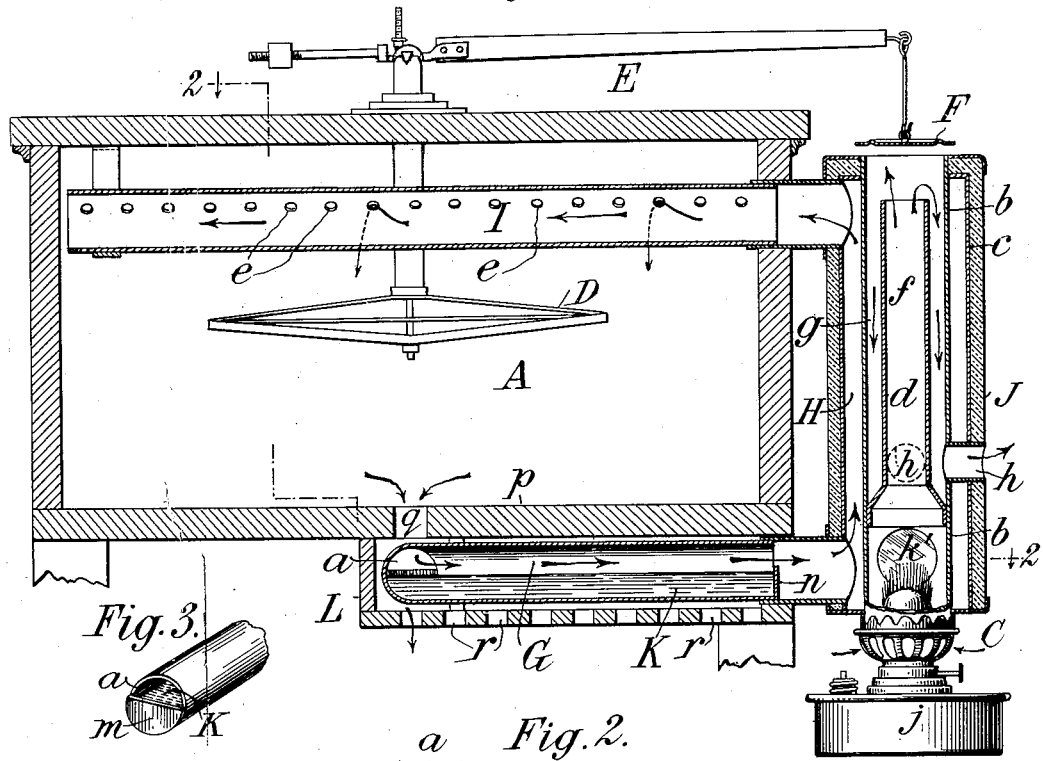
Figure 2:
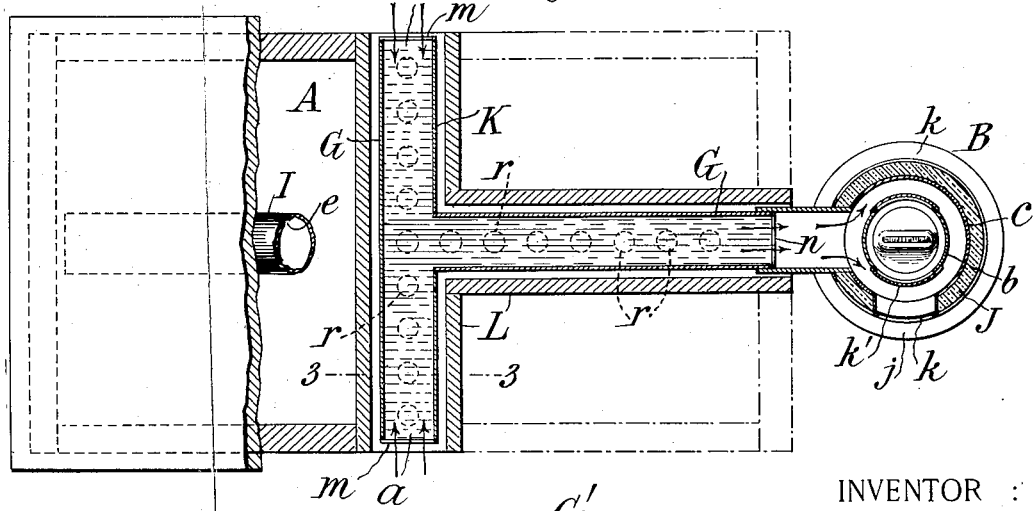
Figure 4:
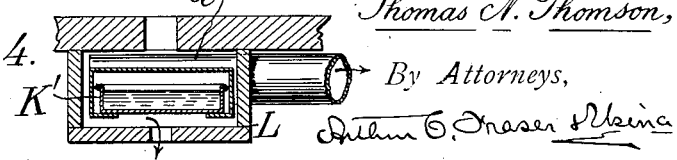

Figure 1 is a vertical section which coincides with the vertical axis of the heater. Fig. 2 is a plan mainly in horizontal section on planes of the line 2—2 of Fig. 1. Fig. 3 is a fragmentary perspective showing a detail. Fig. 4 is a fragmentary section on the line 3—3 of Fig. 2 showing a modified construction.

To economize space on the drawing, the incubator is shown in Fig. 2 somewhat narrower than the usual proportions.

Referring to the drawings, let A designate the incubating chamber which in operation will contain the usual egg trays, and let B designate as a whole the heater which is shown as of the exterior type, C being the lamp (or equivalent heating element) of this heater, and D being any usual or suitable form of thermostat within the chamber A and which serves to communicate motion through the usual controlling lever E for operating the damper or valve F which controls the temperature imparted by the heater to the incubator.

In the particular construction shown a T-shaped air passage G is provided beneath the incubating chamber through which exterior air is admitted to the lower part of the heater. The air enters at one or more inlets *a* which are shown as at the ends of the branches of the T. The discharge end of the air pipe G opens into the bottom of the annular flue H which is formed between an inner metal tube *b* and an outer tube *c*, the latter being covered with insulating material J to confine the heat. From the top of this annular flue H leads a hot-air delivery pipe I which enters the upper part of the incubating chamber, and may extend through the latter or through any suitable part thereof, being provided with numerous perforations *e e* through which to distribute the heated air into the incubating chamber.

The inner tube *b* at its bottom portion serves as the chimney of the lamp or other heating element C, the burner of which is secured in any suitable or convenient way to the bottom of this tube. Somewhat above the flame and at a point where lamp chimneys are commonly contracted, the tube *b* is fitted with an inside tube or chimney *d* forming within it the flue $f$ for products of combustion, which tube is open at its top and which extends to less height than the tube $b$, and is separated sufficiently from the latter to form between them an annular flue $g$. Near the bottom of this latter flue are horizontal outlet flues $h\ h$, one of which is shown in section in Fig. 1 and another in dotted lines. In practice it is sufficient to employ two of these flues $h$ arranged on opposite sides. The disk or damper F is mounted above the open top of the tube $b$ so that as it is raised or lowered by the thermostat it permits more or less of the hot gases to escape directly to the atmosphere, the remaining gases flowing down the annular flue $g$ to the outlets $h$. The body or reservoir $j$ of the lamp C is supported entirely beneath the burner, and where it is exposed on all sides to the atmosphere and to the currents of cool air entering the burner so that the oil reservoir is kept cold. In order that the operator may examine the flame, a window $k$ is provided through the outer tube $c$ and insulated wrapping J, and coinciding therewith is a window $k'$ through the inner tube or chimney base $b$, these windows being closed by mica or other transparent material.

In operation air enters at the inlets $a$ and, flowing through the tube G is admitted to the lower part of the annular flue H so that in rising through this flue it is heated by contact with the hot tube $b$ and the air thus heated flows from the heater through the delivery tube I, whence it is distributed into the chamber A. The hot air and gases from the lamp flame are confined within the tube $b$ which prevents any possible commingling of the products of combustion with the fresh air entering the incubating chamber. The hot gases from the lamp ascend through the flue $f$ and ordinarily escape partly through its upper end under the uplifted damper F and partly descend through the flue $g$ and escape at $h\ h$. The greater part of the heat imparted to the air in the flue H is taken from the descending current of hot gases in the flue $g$ by conduction through the tube $b$. The flow and temperature of the gases in this flue $g$ is determined by the position of the damper F. If this damper were lowered so as to close the top of the flue $b$ all the hot gases would circulate down through the flue $g$ and the maximum quantity of heat would be transmitted through the conducting tube or wall $b$ to the ascending air. If on the contrary the damper F were lifted to its highest position all the products of combustion from the chimney flue $f$ would escape upwardly beneath the damper, and an upward current of cool air would be induced in the flue $g$ entering through the lateral openings $h$ and escaping at the upper end of the flue beneath the damper; so that the cool air thus admitted would serve to cool the metal wall $b$ and diminish or suspend the heating of the air in the flue H. In the intermediate positions of the damper the upward escape of the hot products will be more or less restricted so that a greater or less quantity of the hot gases will be caused to circulate through the flue $g$ with the result that the conducting wall $b$ will be heated to varying degrees. The thermostat D, expanding or contracting in obedience to slight changes of temperature within the incubating chamber, imparts in the usual manner through the lever E rising or falling movements to the damper to such effect that when the temperature becomes slightly too high the damper is lifted and more of the heat is permitted to escape or be short-circuited so as to diminish the heating of the ascending air column; and conversely, if the temperature in the chamber falls below the normal the damper F will be lowered so as to cut off the direct escape of hot gases and force a greater proportion thereof to circulate downwardly so as to more highly heat the partition or wall $b$ and consequently impart greater heat to the air entering the incubator.

Under normal conditions the thermostat will maintain the damper F suspended in approximately the position shown in Fig. 1 so that a partial outlet is provided at the top for the heated gases while yet a portion of these gases is compelled to flow downwardly through the flue $g$, this downward current being varied in volume from time to time by a slight lifting or lowering of the damper as the thermostat responds to slight fluctuations of temperature in the incubating chamber, and to such effect that these fluctuations are quickly and automatically compensated for, so that the incubating chamber is maintained at a temperature more nearly constant than has heretofore been possible by any of the previously known heat-regulating devices. In the event that the lamp should generate an excessive quantity of heat, as by being adjusted to too large a flame, the sensitive thermostat will quickly lift the damper F so high as to afford an area of escape opening beneath it exceeding the area of the chimney flue $f$ so that all of the heated gases will escape at the top and the tube $b$ will be cooled by the upflow of outer air through the annular flue $g$, thus diminishing the efficiency of the heater and preventing the possibility of over-heating the air admitted to the incubator.

Inasmuch as there is no communication between the air flue H and the flues $f\ g$ for gases of combustion, there is no possibility of the fresh air which is heated and admitted to the incubator being vitiated by smoke or products of combustion.

The means for humidifying the air will now be explained. The air, entering the heater through the pipe G is caused to circulate over a water bath which is warmed to an appropriate temperature. In the simple construction shown in Figs. 1 and 2 this water bath is formed within the tube G by providing the latter with partitions m at its inlet ends a and a similar partition n at its outlet end near the heater, these partitions being half-disks, as best shown in Fig. 3, soldered into the round tube so that the lower half of the tube forms a water vessel or tray and the upper half serves as an air passage or flue. The tray thus formed is lettered K. For heating this tray, to warm the water and also the current of air to the required temperature, some of the waste or surplus heat from the incubating chamber is utilized. For this purpose preferably holes are formed through the bottom or floor p of the incubating chamber, one hole being shown in section at q Fig. 1, through which holes the spent warm air from this chamber descends into contact with the tube G. Preferably a housing L is placed around this tube to partially confine the descending warm air and to cause it to circulate around and beneath the tube, the air finally escaping through outlets r r beneath. A modified construction is shown in Fig. 4 where the tray K' is a flat vessel or elongated basin suitably supported within an air tube G' of corresponding shape which is in turn inclosed within the housing L so as to admit of a circulation of warm air around it from the incubating chamber.

As already stated, it is essential to maintain in the incubating chamber a humidity of from sixty to sixty-five per cent. To accomplish this the fresh air before entering the heater is warmed to approximately 85° F. In flowing over the water bath which is warmed to a similar temperature, the air becomes saturated with moisture. Air at this temperature at saturation contains 12.736 grains of water per cubic foot. After this saturated air has been heated by the heater to enough above 103° F. to maintain the temperature within the incubating chamber at approximately 103° F., the stated quantity of moisture gives a humidity in the incubating chamber of about 60 per cent. For determining the precise humidification it is accordingly only necessary to control within reasonably close limits the temperature imparted by the waste heat from the bottom of the incubating chamber to the entering air and to the water bath. This results naturally from the fact that the spent air leaving the incubating chamber has a constant temperature closely approximating 95° F., which results in heating the entering air to a close approximation to 85° F.

An advantage of the illustrated arrangement of air tube G is that the air inlets a are located remote from the heater so as to insure the admission of the purest possible air to the incubator. In prior incubators the air is drawn from the lower part of the heater, near the lamp reservoir, so that it is liable to be vitiated by oil vapors and odors emanating from the lamp. This liability is avoided by the present invention.

An important advantage of the present invention is that it insures the constant and uninterrupted ventilation of the incubating chamber. In prior incubators the temperature control has commonly been effected by discharging more or less of the current of heated air into the atmosphere, instead of directing it into the incubating chamber, so that the proportion of the total column of air that would enter the incubating chamber was subject to frequent variation, and under conditions frequently resulting, so much of the heated air was thus discharged into the atmosphere as to practically suspend the introduction of fresh air into the incubating chamber, so that stagnation of air therein resulted. The present invention wholly avoids this undesirable operation, since the heated air is all directed into the incubating chamber, the function of the regulator being confined to discharging into the atmosphere surplus heat from the lamp. It results that there is maintained in the incubating chamber a constant supply of fresh air which is introduced at uniform temperature. My invention thus results in a constant and uniform heating of the column of air ascending through the heater, and the delivery of all air thus heated into the incubating chamber. Or otherwise stated, my invention insures the transmission through the metal wall b by which the column of air is heated of a constant number of heat units in a given interval of time, any variation in temperature of one part of this wall being compensated for by a corresponding variation in temperature of other parts thereof, so that the average temperature of the entire wall remains practically constant.

This invention is not necessarily limited to the precise details of construction or arrangement shown, but is susceptible of a considerable variation such as would be apparent to those skilled in this art. For example, my invention is not necessarily confined to the use of a water bath or tray of water as the means for humidifying the air, as any source of moisture in contact with the air will answer this purpose. Nor is my invention necessarily confined to drawing all the air to be humidified and heated from outside the incubating chamber, although this is preferable.

What I claim is:—

1. An incubator comprising an incubating chamber, a heater and a humidifier, with air passages relatively arranged to conduct heat from the incubating chamber to the humidifier and to conduct air first through the humidifier and then through the heater, and thence into the incubating chamber.

2. An incubator comprising an incubating-chamber, a heater and a humidifier, with air passages relatively arranged to conduct the warm air leaving the incubating chamber into heat-conductive relation with the humidifier, whereby the residual heat thereof is utilized to heat the humidifier and to conduct air first through the humidifier and then through the heater, and thence into the incubating chamber.

3. An incubator comprising an incubating chamber, a heater and a humidifier, with air passages relatively arranged to conduct the warm air leaving the incubating chamber into heat-conductive relation with the humidifier, whereby the residual heat thereof is utilized to heat the humidifier, and to conduct the moist air from the humidifier to the heater and thence into the incubating chamber.

4. An incubator comprising a heater having an air-heating passage, a humidifying conduit containing moisture through which conduit the air flows to said heating passage, the incubating chamber having a passage for discharging spent air therefrom, said latter passage and the humidifying conduit and incubating chamber being arranged in juxtaposition whereby to warm the air in said conduit by heat from the incubating chamber, whereby the air is uniformly warmed and saturated with a determined amount of moisture and then heated and discharged into the incubating chamber.

5. An incubator comprising an air conduit, means for uniformly warming said conduit by heat from the incubating chamber, a source of moisture in contact with the circulating air, a heater receiving the moistened air from said conduit, and a conduit conducting the moistened air from said heater and discharging it into the incubating chamber.

6. An incubator comprising a heater, an air conduit, means for warming the air in said conduit by heat from the incubating chamber, a water bath arranged to be traversed by the warmed air, the heater receiving the moistened air from said conduit, and an air conduit conducting the air from said heater into the incubating chamber.

7. An incubator comprising a heater having an air-heating passage discharging into the incubating chamber, an air conduit leading to said passage, a source of moisture in said conduit, and means for warming said conduit by the waste heat of the air passing out from the incubating chamber.

8. An incubator comprising a heater having an air-heating passage discharging into the incubating chamber, a humidifying conduit leading from an air inlet to said passage, and a source of moisture in said conduit, the incubating chamber having an outlet for spent heated air from its lower part into conducting proximity to said conduit to warm the entering air therein.

9. An incubator comprising a heater having an air-heating passage discharging into the incubating chamber, a conduit leading from a fresh air inlet to said passage, a source of moisture in said conduit, said housing surrounding said conduit, said chamber having an outlet for spent heated air leading to said housing for warming the entering air in the conduit.

10. In an incubator comprising an incubating chamber and a heater, means for uniformly warming entering air by heat from said incubating chamber to approximately 85 degrees F., and circulating this air in contact with moisture whereby it is humidified to saturation, said heater adapted to then heat this air sufficiently to maintain the incubating chamber at approximately 103 degrees F. and to discharge the air thus heated and humidified into the incubating chamber, whereby the humidity of the air in such chamber is maintained at approximately 60 per cent. of saturation.

In witness whereof, I have hereunto signed my name in the presence of two subscribing witnesses.

THOMAS N. THOMSON.

Witnesses:
WILLIAM F. MARTINE,
FRED WHITE.